United States Patent  [11] 3,611,915

[72] Inventors  Harold Glaser
   St. Louis County, Mo.;
   Richard L. Keats, Port Washington, N.Y.;
   Charley Leach, St. Louis County, Mo.;
   Jerry D. Wood, Plainfield, N.J.
[21] Appl. No. 869,093
[22] Filed  Oct. 24, 1969
[45] Patented  Oct. 12, 1971
[73] Assignee  Glaser Products Corporation
   St. Louis, Mo.

[54] BARBECUE COOKER
   9 Claims, 17 Drawing Figs.
[52] U.S. Cl. .................................................. 99/445,
   99/446, 126/25
[51] Int. Cl. ................................................. A47j 37/07
[50] Field of Search ........................................... 99/444,
   339, 375, 400, 408, 421, 425, 443, 446, 447, 448,
   450, 385; 126/9, 11, 25, 25 A; 211/106, 119, 181;
   220/24, 25, 30

[56]  References Cited
   UNITED STATES PATENTS
Re.4,652  11/1871  Roe ............................... 99/450
1,462,578  7/1923  Kashinsky ..................... 220/30 X
1,783,183  12/1930  Dibble ........................... 99/425
3,276,440  10/1966  Sazegar ......................... 126/25 A
3,500,812  3/1970  Korngold ........................ 126/25
3,520,290  7/1970  Winters ......................... 126/25

Primary Examiner—Walter A. Scheel
Assistant Examiner—Arthur O. Henderson
Attorney—Ralph W. Kalish ABSTRACT: A barbecue cooker of the kettle type which comprises a hemispherical hood or dome-shaped closure and a rounded fire bowl, with hinge means connecting said hood and bowl so as to allow the former to be swung between closed and open condition with respect to said bowl without necessitating disengagement between the same. There is provided within the bowl a cooking grill having a multiplicity of rib members directed inwardly and downwardly toward an inner opening whereby the juices from the meats being cooked will flow toward the said inner opening for flow downwardly therethrough into a receptacle presented therebelow, thus obviating drippings falling on the charcoal with resultant flaring and the like.

PATENTED OCT 12 1971    3,611,915

INVENTORS
HAROLD GLASER
RICHARD L. KEATS
CHARLEY LEACH
JERRY D. WOOD
BY Ralph W. Kalish
ATTORNEY

INVENTORS
HAROLD GLASER
RICHARD L. KEATS
CHARLEY LEACH
JERRY D. WOOD

BY *Ralph W. Kalish*

ATTORNEY 3,611,915

BARBECUE COOKER

BACKGROUND AND SUMMARY OF THE INVENTION

This invention relates in general to barbecue cookers and, more particularly, to cookers of the kettle type having a swingably mounted closure and means for collecting drippings to prevent contact with the fuel.

It is an object of the present invention to provide a barbecue cooker of the kettle type having a hemispherical closure and novel hinge means engaging same so that said closure may be rocked between cooker open condition and closed condition without requiring displacement of the closure to a point remote from the bowl as has been required with structures currently known.

It is another object of the present invention to provide a barbecue cooker of the type stated having novel hinge means for the closure and with means for maintaining same in open condition so that the user is free to attend to the cooking operation while the hook is in such state.

It is a further object of the present invention to provide a barbecue cooker of the type stated which incorporates a meat-receiving grill having inwardly slanted, converging rib members for directing the drippings toward a central opening for flow therethrough into a collector placed therebelow, thereby inhibiting undesired contact of the drippings with the particular fuel.

It is a further object of the present invention to provide a barbecue cooker of the kettle type which embodies a receptacle for spent fuel so that ashes are collected for facile removal from the cooker with attendant maintenance of the adjacent portions of the cooker in an ash-free state.

It is a still further object of the present invention to provide a barbecue cooker of the kettle type which is most economically manufactured; which possesses a simplicity of parts so as to be resistant to breakdown; which incorporates hinge means for the closure which are readily operated by the average household user; and which is durable and reliable in usage.

DESCRIPTION OF THE PRACTICAL EMBODIMENTS

Referring now by reference characters to the drawings which illustrate practical embodiments of the present invention, A generally designates a barbecue cooker of the kettle type comprising a substantially hemispherical fire bowl 1 and a similarly shaped, domelike or hemispherical closure 2. The lower peripheral edge, indicated at 3, of hood 2 is receivable upon the upper peripheral edge 4 of bowl 1 when cooker A is in closed condition; said hood 2 being provided adjacent its lower surface 3 with an offset flange 5, the inner face of which will abut the confronting outer face portion of bowl 1 to thereby render the joint between bowl 1 and hood 2 substantially airtight when cooker A is in said condition.

Cooker A is provided with a tripodal support, designated S, comprising legs 6,6' and 7, which are preferably of tubular stock and having their ends capped; each of which legs at their upper ends are provided with outwardly bent portions, as at 8, for engagement to the lower portion of fire bowl 1, as by bolts 9; with the said portions 8 being maintained against undesired shifting by reception within channels 10 developed by spaced-apart extensions 11 integral with bowl 1. Legs 6,6' and 7 in their main or central portions, as at 12, tend to converge downwardly, being interconnected by a stabilizing bracket 13; and are directed outwardly, as at 14, to present relatively substantially lower end sections 15. The extremities of sections 15 of legs 6,6' are flattened, as at 16, being transversely aligned so that apertures drilled therein are in registration for extension therethrough of an axle 17 carrying wheels 18,18' on its projecting ends so as to render cooker A mobile. Section 15 of leg 7 is adapted to engage the support surface at its extremity to thereby form a three-point support with wheels 18,18' when cooker A is in stationary position, and with the same being removable from detaining contact with the support surface through rearward rocking of cooker A about axle 17 by means of a push bar or handle 19 extending forwardly from bowl 1, being of generally U-shaped with its rearward ends suitably fixed within brackets 20 carried on opposite sides of bowl 1.

Figure 4:
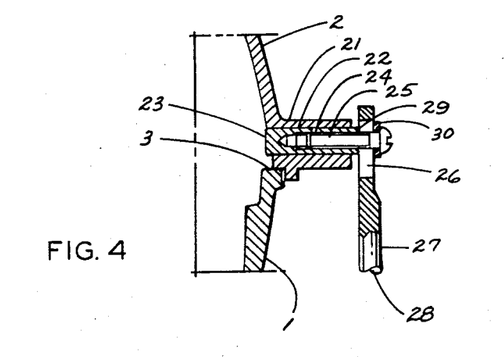
FIG. 4 is a vertical transverse sectional view taken on the line 4—4 of FIG. 2.

Formed integral with hood 2 and extending laterally outwardly therefrom on opposite sides thereof are diametrally opposed tubular bosses 21, each of which is bored throughout its extend, as at 22, for receiving a bushing 23 which projects beyond the outer end of the related boss 21 and is drilled and tapped to provide an outwardly opening threaded socket 24 for engaging the stem of a mounting screw 25 (FIG. 4). The neck of each screw extends outwardly of the proximate boss 21 for projection through a slotlike aperture 26 formed in the upper end portions of the swing arms 27 of a baillike hinge, indicated generally 28. For maintaining screw 25 in preselected disposition within the related slot 26, the outer end face of bushing 23 is serrated, as at 29, (FIG. 7) for bitingly engaging the confronting surfaces of the proximate swing arm 27 adjacent opening aperture 26, while a washer 30 is disposed about the neck of screw 25 for disposition against the adjacent outer surfaces of swing arm 27. By appropriate loosening of screw 25 and commensurate shifting of swing arm 27, the location of screw 25 within opening 26 may be adjusted for purposes presently appearing.

Figure 3:
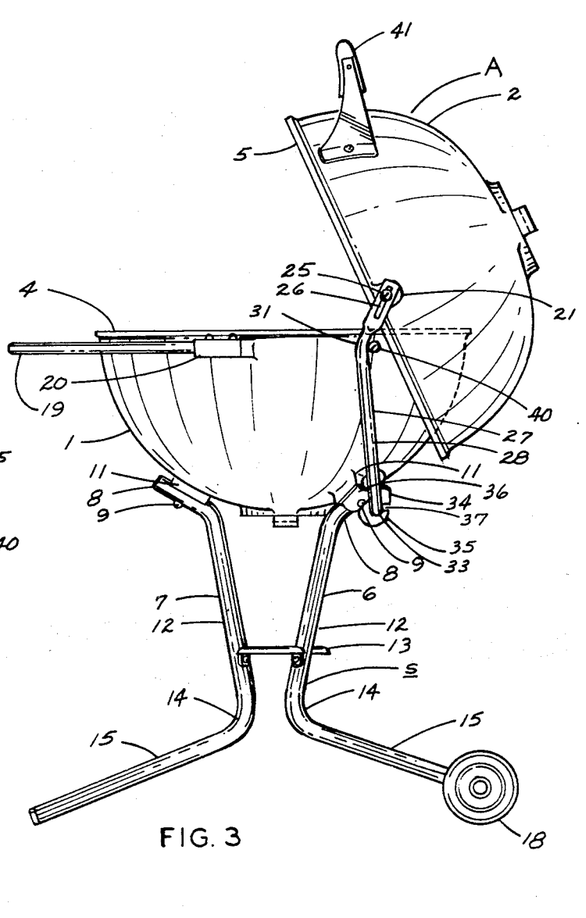
FIG. 3 is a side elevational view illustrating the hood in open position.
Figure 5:
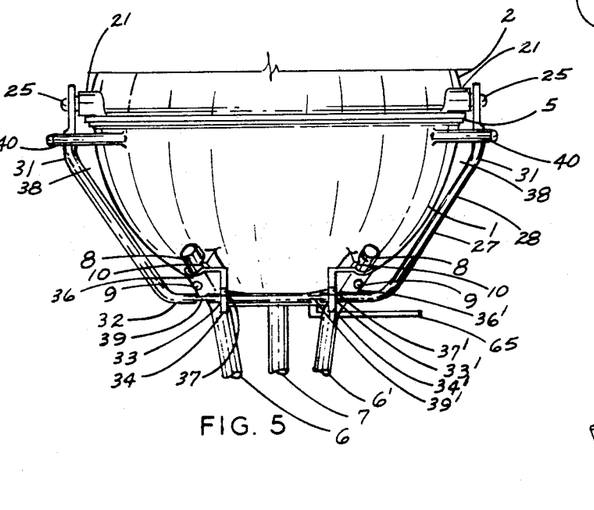
FIG. 5 is a fragmentary rear view taken on the line 5—5 of FIG. 2.

Turning now to FIGS. 3 and 5, it will be observed that hinge 28 is formed of suitable rod stock and thus is of circular cross section; the upper end portions of swing arms 27 being flattened for accommodating apertures 26. Each swing arm 27 proximate its aperture bearing end is bent rearwardly, as at 31, at an angle in the neighborhood of 30° to 40° and is directed inwardly, rearwardly, and downwardly for merging into a horizontal pintle or shaft-forming section 32 which extends tranversely below the rearward lower portion of fire bowl 1 and being received within bearings 33,33' formed in depending lugs 34,34' of brackets 35,35', respectively. Said brackets 35,35' embody semicylindrical portions 36,36', respectively, formed on a radius for disposition against the adjacent leg 6,6', respectively, and maintained thereagainst by the related bolt 9 (FIG. 5). Said bearings 33,33' are continuous with upwardly and rearwardly extending passages 37,37' provided in the related lug. The cross section of passages 37,37' is less than the diameter of the proximate bearing 33,33' so that when shaft-forming section 32 is operatively received within said bearings the same cannot be removed therefrom.

Referring to FIG. 5 it will be seen that the upper end portions of each swing arm 27 cant slightly outwardly toward bend 31 to provide a zone 38 of maximum clearance between swing arms 27 and fire bowl 1 to allow for limited lateral shifting of hinge 28 whereby shaft-forming section 32 may be moved limitedly reciprocally axially in order that flattened portions therein, as indicated 39,39', may be disposed within bearings 33, 33' for permitting withdrawal of said shaft-forming section 32 from support lugs 34,34' as the cross sections of said flattened portions 39,39' permit facile movement of the same through the related passages 37,37'. By such action hood 2 may thus be displaced from fire bowl 1 for disposition at some remote point for any desired purpose. But with hinge 28 presented to bearings 33,33' in the manner illustrated in FIG. 5, hood 2 is in reliably attached condition, proof against accidental displacement.

Projecting from each side of fire bowl 1 immediately beneath its upper edge and in its rearward portion are opposed outwardly protruding fingerlike detents 40 which are of sufficient length so as to protrude into the path of movement of swing arm 27 during rearward rocking of hinge 28 (FIG. 3) engaging same in the region of bend 31 and thus serving as a stop against further rocking.

Figure 1:
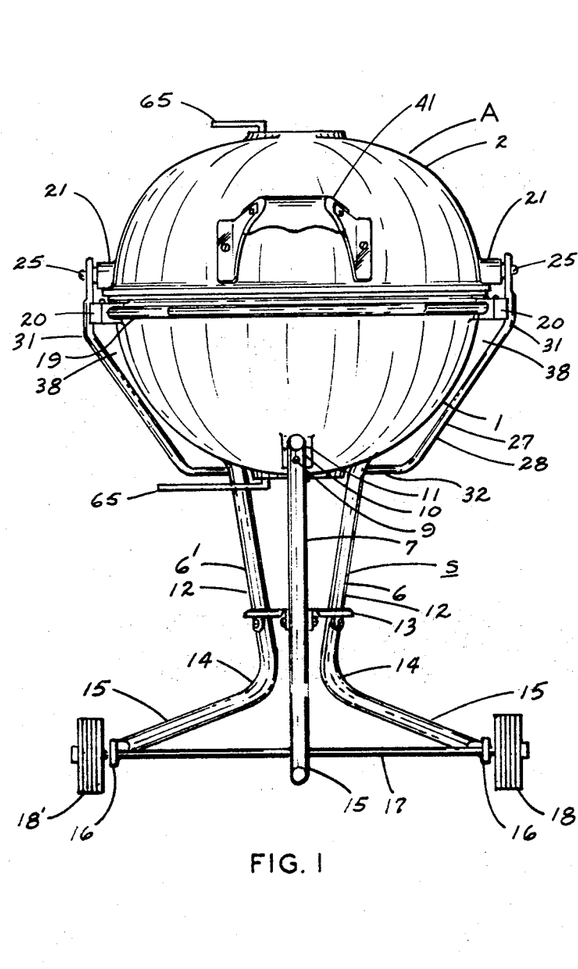
FIG. 1 is a front elevational view of a barbecue cooker constructed in accordance with and embodying the present invention.
Figure 2:
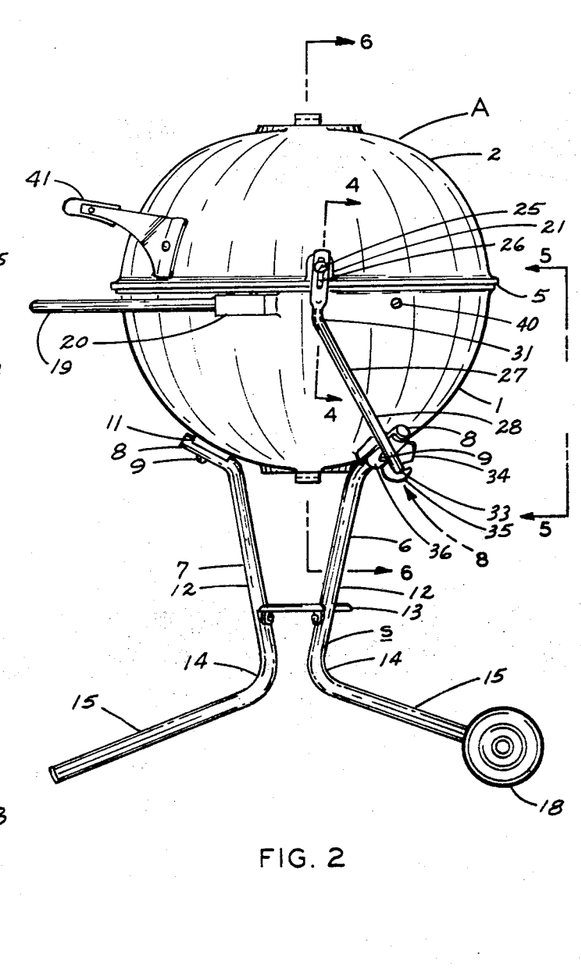
FIG. 2 is a side elevational view with the hood in closed condition.

Thus, in view of the foregoing, it will be seen that hood 2 through use of a handgrip 41 provided on the forward portion thereof may be swung from cooker-closed condition as shown in FIGS. 1 and 2 into open position by reason of the application of an upwardly and rearwardly directed force upon handgrip 41. Thus, the shaft-forming section 32 of hinge 28 will suitably rotate within bearings 33,33' as arms 27 are swung rearwardly until engagement is made with detents 40, at which juncture the rearward portion of hood 2 will have cleared the adjacent portion of fire bowl 1 so that the said hood 2 may thereupon be swung about the axis established through the axis of screws 25 as bosses 21 rotate about bushings 23 whereby hood 2 will approach a substantially vertical disposition thereby allowing the user full access to the interior of cooker A for the intended procedures. Hood 2 may be easily returned to closed condition by downwardly and forward pulling of handgrip 41 with a substantially reverse action occurring as during the opening operation. As indicated above, adjusting the location of screws 25 within the respective apertures 26 will permit of appropriate control of the relationship between hinge 28 and hood 2.

By the novel mounting of hood 2 the same will at all times during usage be maintained integrally with cooker A so that the user is spared the necessity of having to remove the hood and rest same at some convenient location spacedly from the cooker during the cooking operation for the purpose of inspecting the meats being cooked, withdrawing same from cooker A, or placing raw meats thereon. With kettle-type barbecue cookers, there has been the problem of handling the hood so as to allow for access to the cooker interior. By the present invention these difficulties are overcome and the cooker is rendered more easily usable. In view of the foregoing it is obvious that if for any particular purpose, such as, for cleaning and the like, the user should desire to entirely remove hood 2 from cooker A, hinge 28 may be withdrawn from bearings 33,33' in the manner above described.

Figures 6, 7:
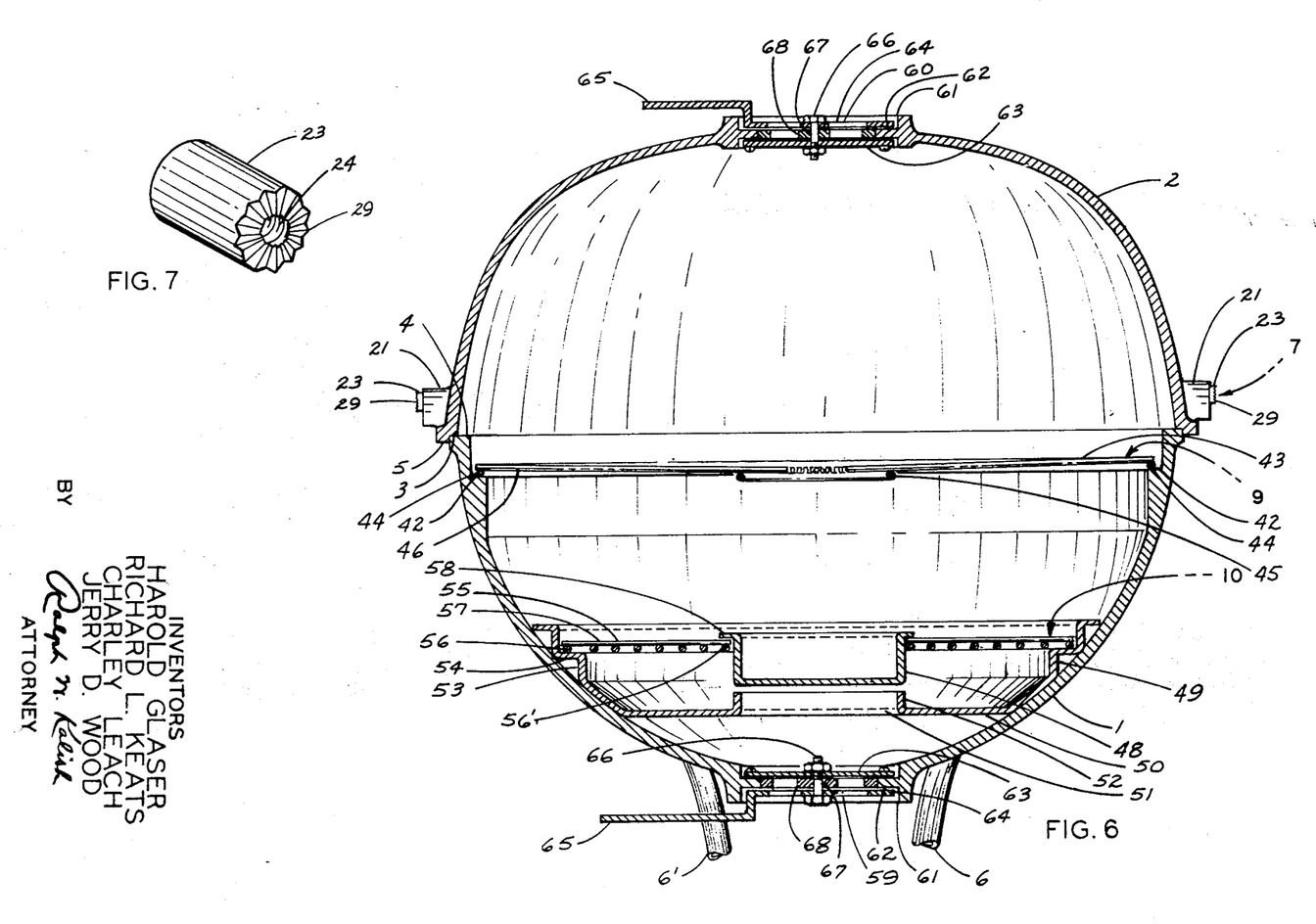
FIG. 6 is a vertical transverse sectional view taken on the line 6—6 of FIG. 2.
FIG. 7 is a perspective view of the bushing.

Bowl 1 on its inner face and slightly downwardly from its upper peripheral edge 4 is provided with an integral annular shoulder 42 for supporting a grill 43 formed of suitable rod stock and comprising an outer ring 44 and an inner, concentric, diametrally relatively reduced ring 45 which are interconnected by a multiplicity of radially extending ribs 46 provided circumferentially throughout grill 43; said ribs being fixed to said rings 44,45 as by welding. In view of the convergence of said ribs 46 at their inner ends, the same are alternatingly cut off so that every other rib projects beyond inner ring 45 for termination inwardly thereof with their end margins defining a central opening 47. With reference being made to FIG. 6 it will be seen that inner ring 45 is located slightly downwardly of outer ring 43, that is, the planes thereof are parallel, so that ribs 46 will be inwardly and downwardly inclined toward the inner ends. The center directed, sloping character of grill 43 conduces to the gravitational flow of drippings from the supported meat into opening 47 for descent into a collector or receptacle 48 located downwardly of grill 43 within fire bowl 1 and maintained by means now to be described.

Figure 10:
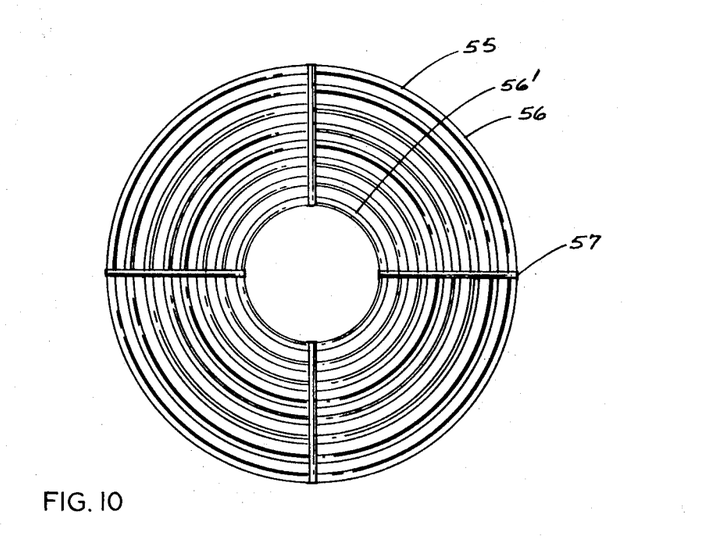
FIG. 10 is a top plan view of the grate.
Figures 14, 15, 16, 17:
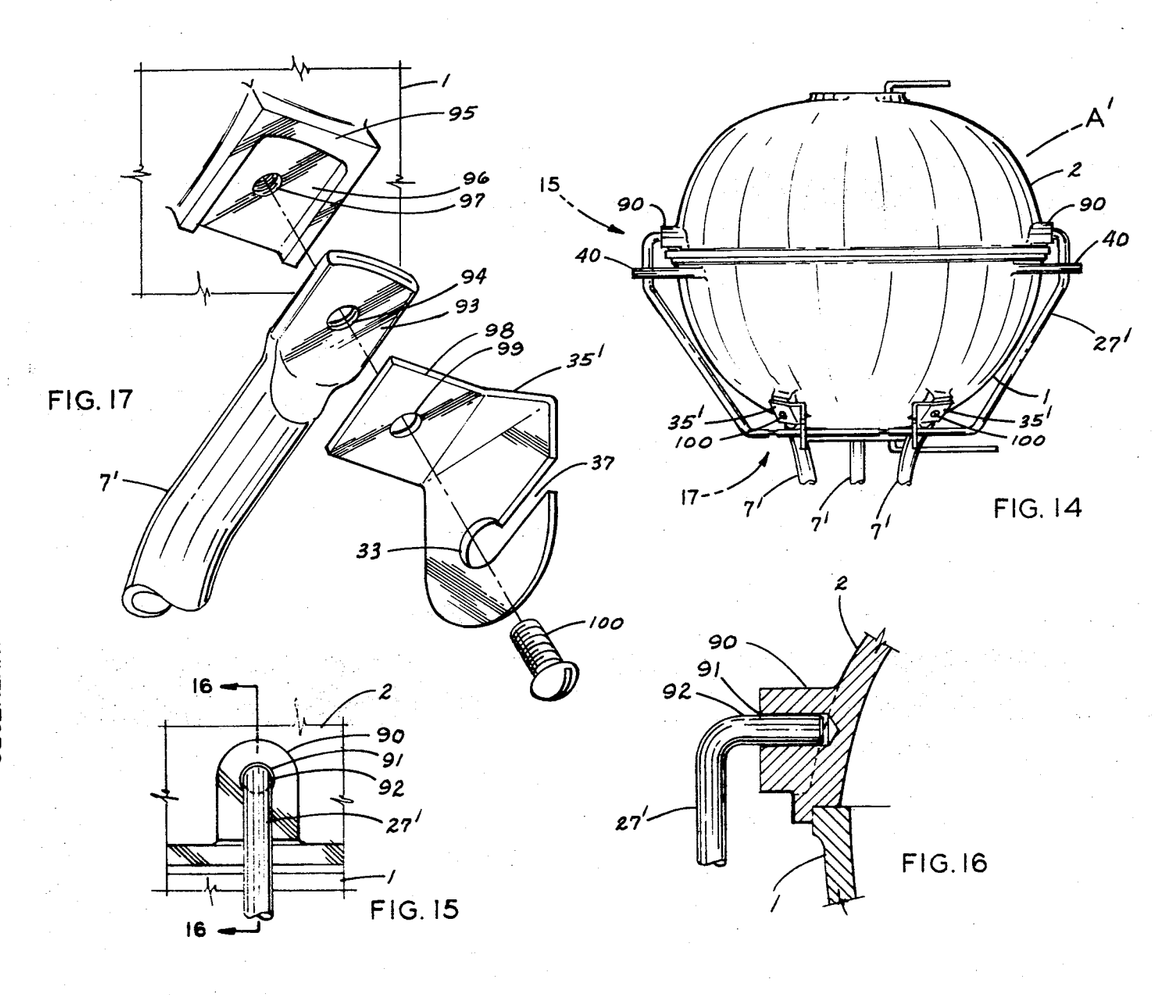
FIG. 14 is a fragmentary rear view taken substantially on the line 5—5 of FIG. 2 but illustrating another form of the barbecue cooker having modified pivot means for the swing arm and means for engaging the legs.
FIG. 15 is a fragmentary side view taken at 15 in FIG. 14.
FIG. 16 is a fragmentary vertical transverse sectional view taken on the line 16—16 of FIG. 15.
FIG. 17 is a fragmentary exploded view taken at 17 in FIG. 14.

Provided for seated disposition upon the lower inner wall portion of fire bowl 1 is a brazier 49 formed of suitable sheet stock and having an annular base wall 50 with a central opening 51 surrounded by a short upstanding flange 52. The sidewall 53 of brazier 49 is provided proximate its upper end with a formed seat 54 for supporting a fuel grid 55 which latter, as may best be seen in FIG. 10, is constructed of rod stock and comprises a plurality of concentric annuli, indicated generally 56, with radially provided ribs 57 welded thereto spacedly throughout the extend of said annuli 56 for integrating said grid components. It is to be seen that the innermost annulus, as indicated at 56', of grid 55, is of such diameter as to permit extension therethrough of collector 48 which latter embodies an upper peripheral out-turned flange 58 for disposition upon the adjacent portions of grid 55 to allow collector 48 to be suspended therefrom. Collector 48 is axially aligned with brazier opening 51 and is disposed in overlying relationship thereto.

It will, accordingly, be observed that in usage the particular fuel, such as, charcoal, will be disposed upon grid 55 surroundingly of collector 48 whereby drippings descending into collector 48 from grill 43 will follow a path removed from said fuel and thereby avoid undesired contact therewith, obviating flaring and like disruptive reactions.

Base wall 50 is presented for receiving the spent fuel or ashes which descend through fuel grid 55. Thus, brazier 49 prevents the depositing of ashes upon the inner wall or fire bowl 1 and promotes ease of maintenance of cooker A by reason of ready withdrawal of brazier 49 for cleaning purposes; it being recognized that fuel grid 55 and collector 48 may be accordingly withdrawn unitarily with brazier 49 if desired. Thus, brazier 49 is so contoured as to be wedgingly supported upon the lower portion of fire bowl 1 but spacedly upwardly from the bottom thereof so as to present the fuel in desired relationship to grill 43 as well as to promote appropriate ventilation by airflow through a damper device 59 in said fire bowl 1 and opening 51 for requisite combustion of the fuel.

In passing, it may be noted that the unique slope of grill 43, together with the particular relationship of opening 47 and collector 48, provides a means for controlling the flow of drippings so that heat-producing means other than charcoal, such as, for instance, an electric coil or a gas burner, could be used with safety.

Damper device 59 is opposed to an identical device, indicated 60, provided in hood 2 with the said devices 59,60 being in a zenith-nadir relationship with each being supported within an opening 61 formed in the respective bowl or hood; there being an annular support shoulder 62 projecting inwardly of each opening 61 for disposition against its inner and outer surfaces of an apertured plate 63 and a control plate 64, respectively; said latter incorporating a handle 65. Apertured plate 63 and control plate 64 are mounted upon a bolt 66 located axially of the related opening 61 and extending through the central opening 67 of a spacer plate 68 located within the portion of the opening defined by the support shoulder 62. Said spacer plate 68 and said control plate 64 are suitably provided with openings so that in accordance with accepted practice manipulation of control plate 64 by handle 65 will permit of desired adjustment of airflow.

Figures 8, 11, 12, 13:
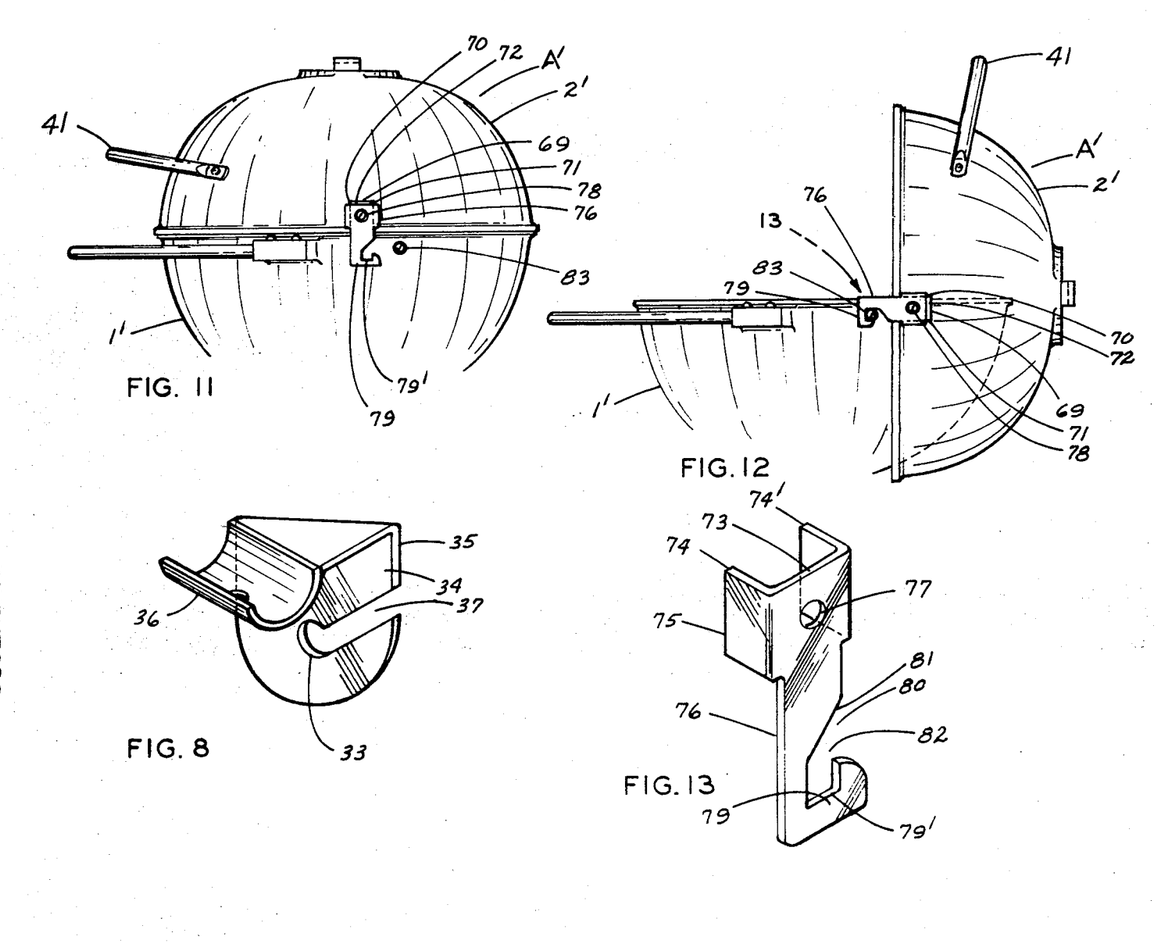
FIG. 8 is a perspective view of a bracket shown in FIG. 2.
FIG. 11 is a fragmentary side elevational view illustrating another form of the barbecue cooker constructed in accordance with and embodying the present invention.
FIG. 12 is a fragmentary side elevational view showing the hood in open position.
FIG. 13 is an enlarged perspective view of the bracket shown in FIGS. 11 and 12.
Figure 9:
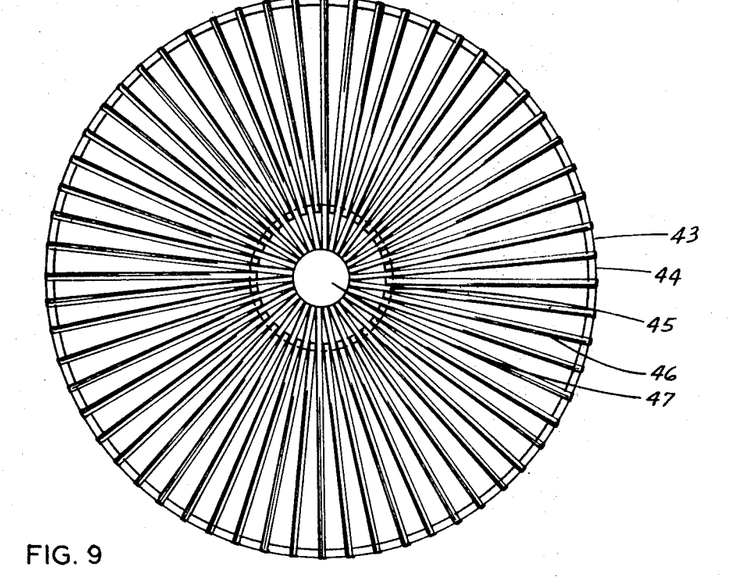
FIG. 9 is a top plan view of the grill.

Referring now to FIGS. 11, 12 and 13, A' designates a barbecue cooker of the kettle type having a fire bowl 1' and hemispherical closure 2' which are structurally and functionally identical to bowl 1 and hood 2 of cooker A hereinabove described, so that components of the same corresponding to like components of said bowl 1 and hood 2 will be indicated by the same reference numerals to expedite comprehension. Integral with hood 2' immediately adjacent its lower peripheral margin and projecting outwardly from diametrally opposed sidewall portions thereof, equidistant from handgrip 41, are bosses 69. Each boss 69 embodies parallel forward and rearward faces 70,71, respectively, and a lateral side face 72 therebetween for disposition thereagainst of the web 73 and side flanges 74,74', respectively, of the channel-shaped mounting bracket portion 75 of a bearing arm 76. Side web 73 is provided with an aperture 77 for alignment with a tapped opening (not shown) in boss 69 for reception of a retaining screw 78 whereby each bearing arm is rigid with respect to hood 2'. Said bearing arm 76 extends downwardly from mounting bracket portion 75 to a point spacedly below the lower peripheral margin of hood 2'. Each bearing arm 76 at its lower end is of hook shape, as at 79, so as to present a bearing surface 79' which is continuous with a slotlike recess 80, the upper surface 81 of which is inclined upwardly and rearwardly to define with said hook portion a relatively enlarged mouth 82. Provided on either side of fire bowl 1' and projecting laterally outwardly from corresponding portions, on opposite sides thereof, and slightly downwardly of its upper peripheral margin are trunnions 83 having a diameter commensurate with the extent of bearing 79' and less than the cross section of passage 80. Said trunnions 83 are so located on fire bowl 1' that when hood 2' is in closed condition (FIG. 11) the same will be presented spacedly rearwardly of the proximate bearing arm 76 and in horizontal alignment with mouth 82 thereof.

In swinging hood 2' upwardly by handgrip 41 for opening of cooker A' the user will perforce cause a rearward component of travel to said hood 2' so that by such movement trunnions 83 will be relatively moved into recesses 80 via mouths 82 whereby as hood 2' is rocked rearwardly surface 81 will guide said trunnion 83 into disposition with bearing surface 79' (see FIG. 12). In this condition hook 79 engages the related trunnion 83 so as to maintain hood 2' upon fire bowl 1' when the former is in full-open condition. Thus, by the simple expedients of trunnions 83 and bearing arm 76 an interengagement is effected between hood 2' and bowl 1' so as to obviate the necessity of completely detaching hood 2' and support same at a remote point.

To return hood 2' to closed condition merely requires a reverse operation with bearing 79' being moved relatively about the related trunnion 83 and with the final closing action comprehending the expected forward travel component.

Referring now to FIGS. 14–17, A' generally designates a barbecue cooker substantially identical with cooker A hereinabove except to the extend hereinbelow described; like reference numerals being utilized for corresponding parts and elements for the purpose of facilitating this description. Cooker A' incorporates a hemispherical fire bowl 1 and a hood 2. Integrally cast or otherwise formed with hood 2 at diametrally opposed locations on its sides are bosses 90, each having an outwardly opening bore 91 for receiving the pivot-forming, inturned upper ends 92 of a swing arm 27'; said latter being in all respects similar to swing arm 27 except for the character of the upper end portions thereof. It will be seen that upper ends 92 are of such extent as to be adequately journaled within bores 91 so as to allow for facile rocking of hood 2 and to allow of lateral projection beyond hood 2 to assure of proper, unimpeded operation of swing arm 27'. It will be observed that swing arm 27' as manufactured is of sufficient resiliency to allow of adequate mutual spreading for permitting entry of ends 92 within the respective bores 91; and to thereby be urged in such relationship by the inherent bias.

Cooker A' is supported by legs 7' of the same general character as legs 7 hereinabove but each of said legs 7' is provided with a flattened upper end 93 having a substantially central aperture 94. The said flattened upper ends 93 are received within bosses 95 provided at the requisite locations on the under portion of fire bowl 1 which bosses 95 incorporate a generally rectangular recess 96 within which the said flattened ends 93 snugly fit, with the side edges of said flattened ends 93 abutting against the side and upper walls of recess 96. Centrally of recess 96 there is provided a tapped opening 97 for alignment with aperture 94.

Disposed against the underface of the flattened portion 93 of each leg 7' is the flangelike extension 98 of a bracket 35' which is fundamentally identical with brackets 35, 35' above described, incorporating a bearing 33 and connecting passage 37 so as to cooperate with the received portion of swing arm 27' in the same manner hereinabove set forth. Flange 98 is centrally drilled to present an opening 99 for alignment with aperture 94 and opening 97 for reception of a retaining screw 100. Accordingly, the securing of legs 7' to bowl 1 is easily accomplished and with the same being held in stable condition during usage.

Having described our invention what we claim and desire to obtain by Letters Patent is:

1. A barbecue cooker comprising means defining an upwardly opening fire bowl, means defining a dome-shaped hood adapted for closurewise disposition upon said fire bowl, hinge means interengaging said bowl and said hood for movement of the latter between cooker-opened and cooker-closed condition comprising a pair of swing arms, an intervening shaft portion, means rockably securing said swing arms to said hood, and bearing means provided on said bowl for receiving said shaft portion.

2. A barbecue cooker as defined in claim 1 and further characterized by said means engaging said swing arms to said hood being located on diametrally opposed portions of said hood and incorporating pivot means, and said bearing means being located downwardly of the rear portion of said bowl and presented along a transverse axis.

3. A barbecue cooker as defined in claim 2 and further characterized by said swing arms having portions extending outwardly of said hood and bowl to permit of limited lateral shifting of said hinge means, means for locking said shaft portion within said bearings against accidental displacement upon lateral shifting of said hinge in one direction, and means for presenting said hinge for disengagement from said bearings upon lateral shifting in the opposite direction.

4. A barbecue cooker as defined in claim 1 and further characterized by said means securing said swing arms to said hood comprising bosses provided on opposed sides of said hood and extending laterally thereof, each boss being provided with an outwardly opening axial bore, said swing arms having at their extremities inturned pivot-forming portions for reception within the bore of the proximate boss.

5. A barbecue cooker comprising means defining an upwardly opening fire bowl, a grill provided within said fire bowl, means for supporting said grill in operative position, said grill having a central opening and with its adjacent portions sloping downwardly toward said opening and gravitationally directing drippings therethrough.

6. A barbecue cooker as defined in claim 5 and further characterized by said grill having an outer annular member and an inner annular, concentric member, radial ribs secured at their ends to said inner and outer annular members, said inner annular member being located downwardly of said outer annular member so that said ribs incline inwardly and downwardly toward said inner annular member, the inner ends of said ribs define said central opening through which drippings will gravitationally move, and collector means provided within said fire bowl in alignment with said central opening but downwardly thereof for receiving drippings passing through said central opening.

7. A barbecue cooker as defined in claim 5 and further characterized by a brazier removably positionable within said fire bowl downwardly of said grill, a fuel-supporting grid provided on said brazier, said grid having a central opening, and means for collecting drippings from said grill provided in said grid central opening and being located in vertical alignment with the center of said grill.

8. A barbecue cooker comprising means defining an upwardly opening fire bowl, means defining a dome-shaped hood adapted for closurewise disposition upon said fire bowl, hinge means interengaging said bowl and said hood for movement of the latter between cooker-opened and cooker-closed condition comprising a pair of swing arms, an intervening shaft portion, means rockably securing said swing arms to said hood, bearing means provided on said bowl for receiving said shaft portion, said swing arms having portions extending outwardly of said hood and bowl to permit of limited lateral shifting of said hinge means, means for locking said shaft portion within said bearings against accidental displacement upon lateral shifting of said hinge in one direction, and means for presenting said hinge for disengagement from said bearings upon lateral shifting in the opposite direction.

9. A barbecue cooker as defined in claim 8 and further characterized by said means for locking said shaft portion within said bearings comprising means defining passages continuous with said bearings and having a cross section less than the maximum cross section of said bearings and less than the maximum cross section of said shaft, said shaft having spaced-apart portions of reduced cross section for permitting movement through said passages upon commensurate axial shifting of said shaft.